(12) United States Patent
Kaplan et al.

(10) Patent No.: US 9,703,467 B2
(45) Date of Patent: Jul. 11, 2017

(54) MOVING AN IMAGE DISPLAYED ON A TOUCHSCREEN OF A DEVICE HAVING A MOTION SENSOR

(71) Applicant: International Business Machines Corporation, Armonk, NY (US)

(72) Inventors: Philippe Kaplan, Le Rouret (FR); Georges-Henri Moll, Villeneuve-Loubet (FR); Xavier Nodet, Antibes (FR); Olivier Oudot, Vallauris (FR)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 14/482,553

(22) Filed: Sep. 10, 2014

(65) Prior Publication Data

US 2015/0116239 A1   Apr. 30, 2015

(30) Foreign Application Priority Data

Oct. 24, 2013   (GB) .................................. 1318811.5

(51) Int. Cl.
*G06F 3/0485*   (2013.01)
*G06F 3/0488*   (2013.01)
*G06F 3/041*   (2006.01)

(52) U.S. Cl.
CPC ........ *G06F 3/0485* (2013.01); *G06F 3/04883* (2013.01)

(58) Field of Classification Search
USPC ................................................ 345/684, 688
See application file for complete search history.

(56) References Cited

U.S. PATENT DOCUMENTS 8,354,997 B2    1/2013  Boillot
2008/0048878 A1*  2/2008  Boillot .................... G06F 3/017
                                                      340/686.1

(Continued)

FOREIGN PATENT DOCUMENTS

EP    1818768    8/2007
EP    2189890    5/2010

(Continued)

OTHER PUBLICATIONS

Sven Kratz, Sensor-Based User Interface Concepts for Continuous, Around-Device and Gestural Interaction on Mobile Devices, LMU, Ludwig-Maximilians-Universitat, Munchen, Jun. 6, 2012, 87 pages.

(Continued)

*Primary Examiner* — Caroyln R Edwards
*Assistant Examiner* — Deeprose Subedi
(74) *Attorney, Agent, or Firm* — Schmeiser, Olsen & Watts, LLP; John Pivnichny

(57) ABSTRACT

A method and associated device for moving an image of displayable content displayed on a touchscreen of the device. Movement of an object along the touchscreen of the device toward an outer edge of the touchscreen is detected, and in response, the displayed image is moved toward the outer edge in synchronization with the detected movement of the object. It is determined that the object has traversed the outer edge of the touchscreen so as to no longer be touching the touchscreen, and in response, one or more motion sensors are activated to monitor the object for continuing movement of the object. The one or more motion sensors ascertain the continuing movement of the object away from the outer edge, and in response, the displayed image is moved toward the outer edge in synchronization with the ascertained continuing movement of the object.

20 Claims, 11 Drawing Sheets

(56) References Cited

U.S. PATENT DOCUMENTS

| | | |
|---|---|---|
| 2010/0013782 A1 | 1/2010 | Liu et al. |
| 2010/0095206 A1 | 4/2010 | Kim |
| 2011/0109575 A1* | 5/2011 | Lii .................. G06F 3/0481 345/173 |
| 2011/0122159 A1* | 5/2011 | Bergsten ............ G06F 3/0482 345/684 |
| 2011/0205163 A1 | 8/2011 | Hinckley et al. |
| 2011/0316888 A1 | 12/2011 | Sachs et al. |
| 2012/0054670 A1* | 3/2012 | Rainisto ............ G06F 3/04883 715/784 |
| 2012/0081316 A1 | 4/2012 | Sirpal et al. |
| 2013/0082958 A1 | 4/2013 | Reeves et al. |
| 2013/0179829 A1* | 7/2013 | Kwon ................ G06F 3/0488 715/784 |
| 2014/0002502 A1* | 1/2014 | Han .................. G06T 11/60 345/646 |

FOREIGN PATENT DOCUMENTS

| | | |
|---|---|---|
| EP | 2255297 | 12/2010 |
| EP | 2347321 | 7/2011 |
| EP | 2402848 | 1/2012 |
| EP | 2418573 | 2/2012 |
| WO | WO 2012140593 | 10/2012 |

OTHER PUBLICATIONS

Ruiz et al., User-Defined Motion Gestures for Mobile Interaction, CHI 2011, Session: Mid-air Pointing & Gestures, May 7-12, 2011, Vancouver, BC, Canada, 10 pages.

* cited by examiner

MOVING AN IMAGE DISPLAYED ON A TOUCHSCREEN OF A DEVICE HAVING A MOTION SENSOR

TECHNICAL FIELD

This invention relates to a method of operating a device comprising a touchscreen and a motion sensor and to the device itself.

BACKGROUND

Touchscreen devices are very common. Modern smartphones and tablet computers are almost always provided with a touchscreen, which allows a user in interact with the device by touching the screen with the user's finger or a suitable stylus. A user can interact with a touchscreen using scrolling and panning with a small touchscreen device such as a mobile phone, PDA, or tablet etc. For example, the user can move the user's finger on the touchscreen, dragging the image displayed on the touchscreen accordingly. On these devices, the size of the screen is a limitation of the interaction range, and compels the user to repeat some gestures such as the scroll/pan gesture on the sensitive area (the touchscreen) until the interaction is over. The cycle of touch, drag, release and move back can be repeated several times. Each cycle interrupts the interaction, slowing it down and disrupting the user gesture. Additionally, the user's finger or stylus hides a portion of the touchscreen during the interaction.

BRIEF SUMMARY

According to a first aspect of the present invention, there is provided a method of operating a device comprising a touchscreen, a motion sensor and a processor connected to the touchscreen and the motion sensor, the method comprising the steps of displaying an image on the touchscreen, detecting a touch of an object on the touchscreen, detecting movement of the touch on the touchscreen, moving the displayed image in correspondence to the detected movement, detecting continuing movement with the motion sensor of the object to the side of and in the same plane of the touchscreen, and moving the displayed image in correspondence to the detected continuing movement.

According to a second aspect of the present invention, there is provided a device comprising a touchscreen, a motion sensor and a processor connected to the touchscreen and the motion sensor, the processor arranged to display an image on the touchscreen, detect a touch of an object on the touchscreen, detect movement of the touch on the touchscreen, move the displayed image in correspondence to the detected movement, detect continuing movement with the motion sensor of the object to the side of and in the same plane of the touchscreen, and move the displayed image in correspondence to the detected continuing movement.

According to a third aspect of the present invention, there is provided a computer program product on a computer readable medium or storage device for operating a device comprising a touchscreen, a motion sensor and a processor connected to the touchscreen and the motion sensor, the program product comprising instructions for displaying an image on the touchscreen, detecting a touch of an object on the touchscreen, detecting movement of the touch on the touchscreen, moving the displayed image in correspondence to the detected movement, detecting continuing movement with the motion sensor of the object to the side of and in the same plane of the touchscreen, and moving the displayed image in correspondence to the detected continuing movement.

Owing to the invention, it is possible to provide a device with a combination of a touchscreen and one or more motion sensors, which allow a seamless interaction that is initiated, for example, by a user's finger on the touchscreen and is continued outside the screen, which will scroll and/or pan the image displayed by the touchscreen device. The interaction is always initiated on the touchscreen and once the user reaches the edge of the touchscreen, instead of interrupting the interaction, the user simply keeps moving the finger away from the touchscreen, which will continue moving the displayed image. The motion sensors capture the user's movement and take over the interaction seamlessly. The motion sensors detect external movement using appropriate optical detection technology such as a suitable camera. The user can keep scrolling/panning the displayed image by moving the user's finger anywhere in the screen plane and the touchscreen or the motion sensors manage the interaction according to where the finger is, respectively on or outside the screen. The interaction is stopped on the touchscreen, by releasing the finger, and outside the touchscreen, by moving up the finger vertically until it goes outside the motion captor scope (defined by a customizable threshold) or going out of the range of the motion captors. The image displayed could be from the following (non-exhaustive) list: a bitmap, a video, a map, a table, a spreadsheet, a list or a document, etc. In general being any kind of content that does not fit entirely into the device touchscreen.

The methodology provides a number of advantages. Scroll and pan interactions are not ended when the user reaches the edge of the touchscreen, which normally happens very quickly on a small device. The device knows where the finger leaves the touchscreen, making it easier to catch and follow the finger presence outside the touchscreen. A random movement in the motion capture range cannot scroll the image by itself because it is not identified in the continuity of the interaction. The user's finger or stylus does not hide the touchscreen while outside the touchscreen boundaries. No switching to a special mode is needed as the interaction is initiated on the touchscreen.

In one embodiment, the method further comprises detecting that the object has moved a predefined distance away from the plane of the touchscreen and halting movement of the displayed image. The device can be configured so that it will detect when the user has stopped the current motion, and this can be in reference to the user's finger or stylus moving away from the plane of the touchscreen. This provides an effective way of detecting that the user's finger or stylus is no longer within the same panning or scrolling motion. If the user's device is flat on a horizontal table, for example, then the movement upwards a specific distance will end the current motion.

Advantageously, the method further comprises generating a vector for the detected touch of the object on the touchscreen and determining that the detected continuing movement of the object to the side of and in the same plane of the touchscreen is within a predetermined error of the generated vector. The device can define a vector that effectively models the user's touch on the touchscreen. This vector can then be used to check if the movement outside of the touchscreen corresponds to the original touch of the user on the touchscreen. This can be used to prevent inadvertent movement of the image if the user is not actually continuing with the current movement.

The method further comprises detecting that the object is no longer touching the touchscreen and activating the motion sensor to detect the continuing movement of the object. The motion sensor(s) can be configured so that they are only in detection mode when the user actually makes a touch that reaches the edge of the touchscreen. This is the indicative that the user is likely to carry on with the current motion outside the scope of the touchscreen and therefore the motion sensors need to be activated to detect the motion of the user's finger or stylus. In one embodiment, the motion sensor comprises a set of individual motion sensors placed around the touchscreen. This provides coverage for detecting the user's motion which could take place at any side of the touchscreen.

DETAILED DESCRIPTION

Figure 1:
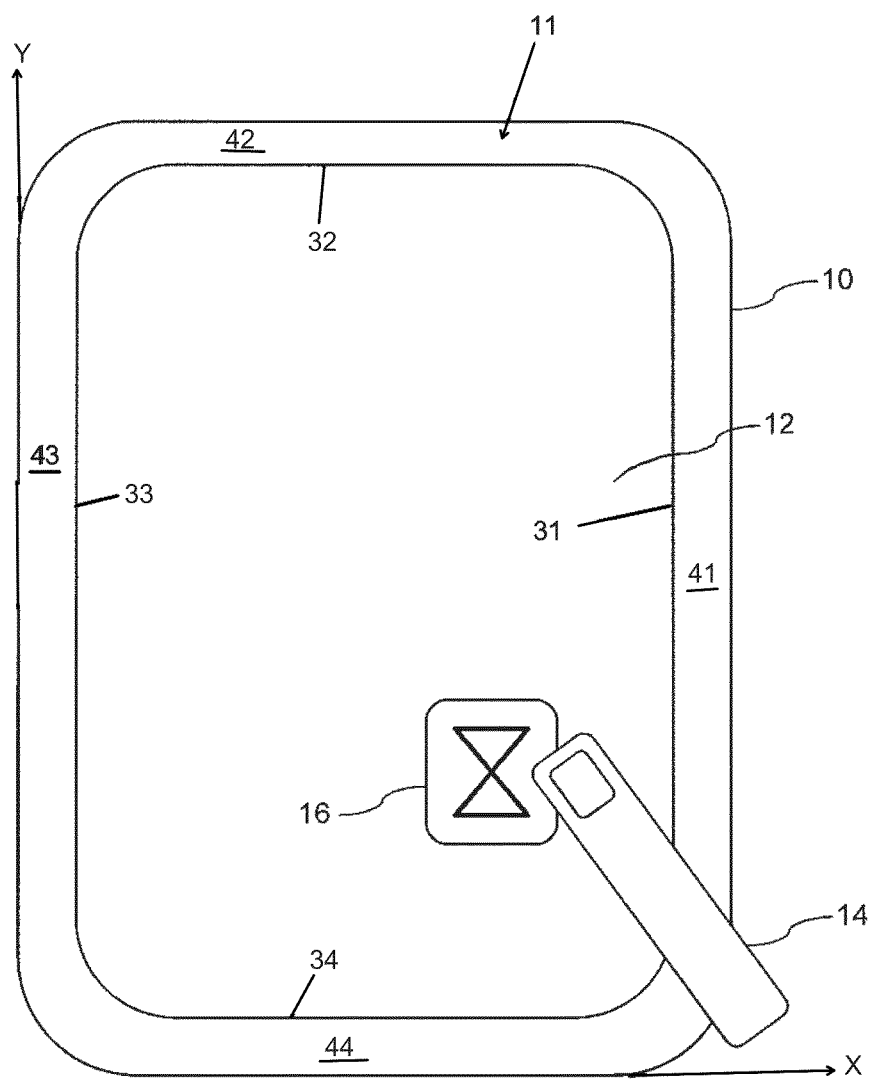
FIGS. 1 to 4 are schematic diagrams of a touchscreen device, in accordance with embodiments of the present invention.

FIG. 1 shows a schematic diagram of a touchscreen device 10, which may be a smartphone that combines mobile telephony with advanced data and network functions such as Internet access and email, in accordance with embodiments of the present invention. Alternatively, the device 10 may be a computer (e.g., a person computer). The front face of the touchscreen device 10 is taken up almost entirely by a touchscreen 12 having outer edges 31-34. The touchscreen 12 combines display and user interface functionality. The device 10 comprises a peripheral region 11 surrounding the touchscreen 12. The peripheral region 11 is in direct physical contact with outer edges 31-34 of the touchscreen 12. The peripheral region 11 comprises subregions 41-44 which are in direct physical contact with respective outer edges 31-34. The device 10 is provided with high-resolution display functionality by the touchscreen 12, and the user can touch anywhere on the touchscreen 12 with the user's finger 14, in order to interact with elements of the image being shown by the touchscreen 12. Some touchscreens 12 also support the use of a stylus to interact with the touchscreen. The orthogonal coordinates X and Y denote horizontal and vertical directions, respectively.

The device 10 also provides computing functionality since the processor and memory capabilities of the device 10 support the running of complex computing applications such as a word processor and a spreadsheet. The user can touch an icon 16, in order to launch an application such as a word processing application. The user touches the touchscreen 12 in the region that shows the icon 16 and this will cause the processor of the device 10 to launch the corresponding application, and the touchscreen 12 will be controlled accordingly. The user can then interact with the application in much the same way as the user would in more conventional computing environment such as using a desktop computer.

In one embodiment, the device 10 is a mobile device. An issue with the device 10 may be that since the device may be designed for mobile telephony there tend to be size and weight limits for the device 10, in order that the device 10 can be considered truly portable and also suitable for use as a telephone. This means that the size of the touchscreen 12 may be limited by the overall size of the device 10. Although the touchscreen 12 uses almost all of the usable space on the front of the device 10, only a limited amount of information can be displayed on the touchscreen 12, certainly when compared to the amount that can be displayed on a computer monitor or laptop screen.

In one embodiment, the device 10 is a computer (e.g., a personal computer).

Figure 2:
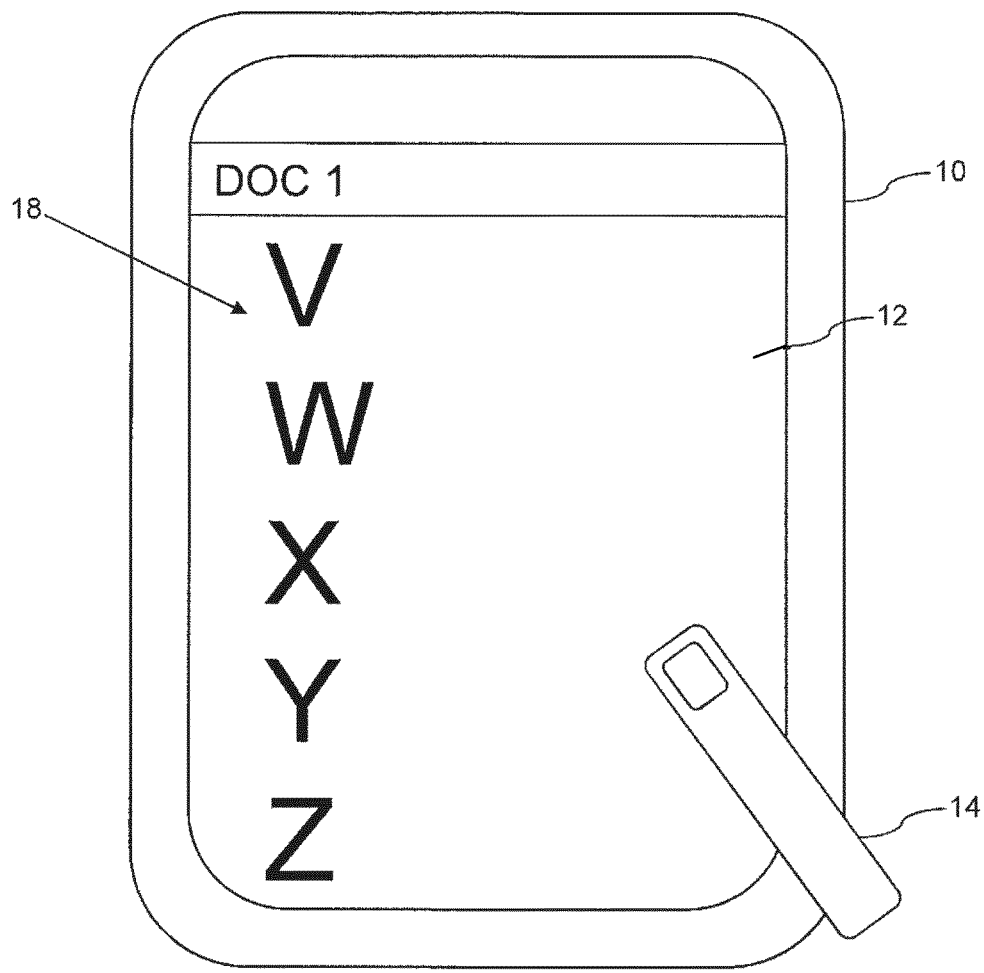

FIG. 2 shows the device 10 with an image 18 displayed on the touchscreen 12, in accordance with embodiments of the present invention. Here the image 18 is part of a document that has been opened by the user within a word processing application. Generally, the image 18 comprises any displayable content on the touchscreen 12. The relatively small size of the display area of the touchscreen 12 relative to the size of the document itself means that only a small portion of the document is visible to the user at any one time. If the user wishes to view part of the document that is not currently shown on the touchscreen 12, then the user will need to scroll the document up or down, in order to move the document view so that the part that the user wishes to look at is visible on the touchscreen 12.

Figure 3:
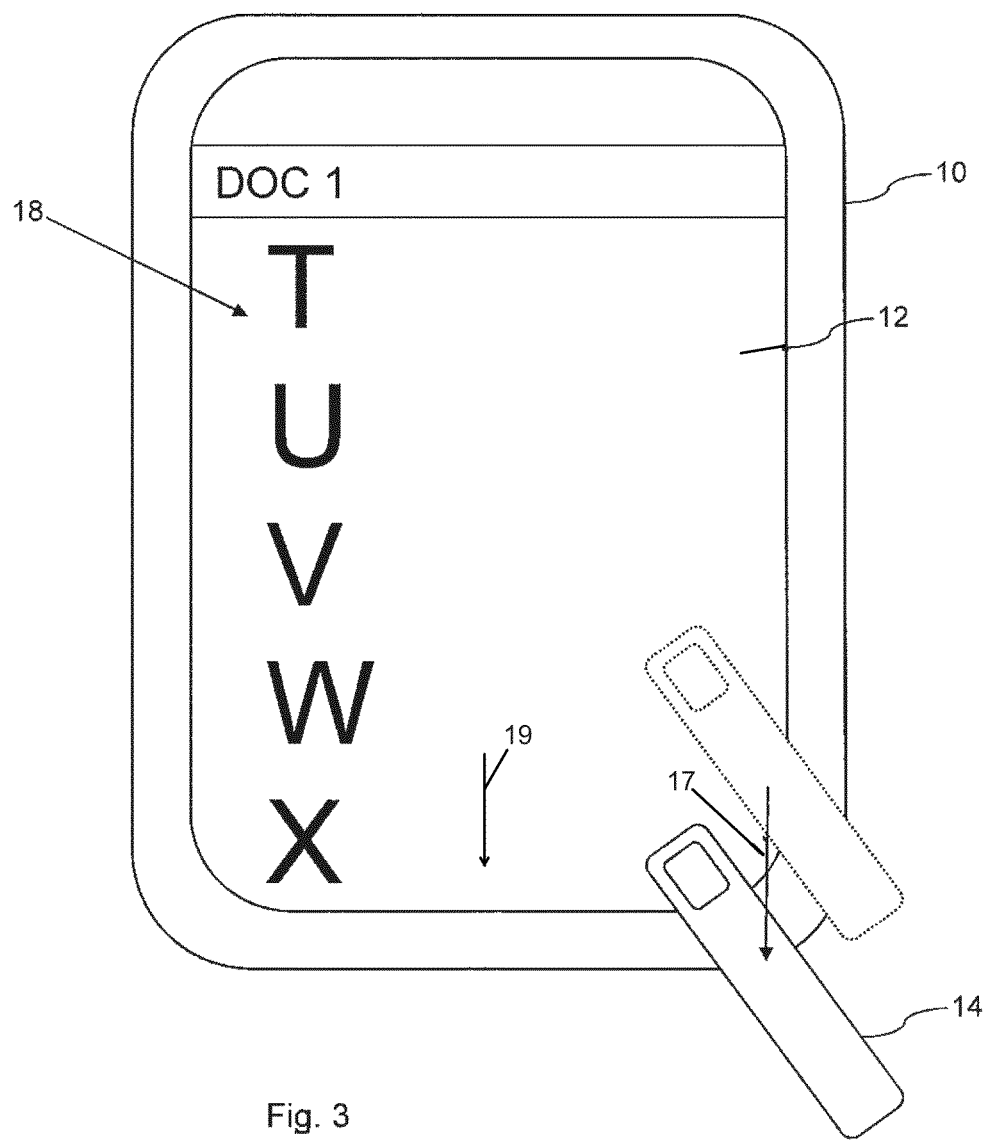

On touchscreen devices such as the smartphone 10, this is accomplished by the user touching the touchscreen 12 and dragging the user's finger 14 in the direction that the user wishes to move the document, as shown in FIG. 3, in accordance with embodiments of the present invention. In a word processing application, the document is likely to be aligned with the left and right sides of the touchscreen 12 and the scrolling will be in the vertical up and down directions, in terms of the alignment of the device 10 as shown in FIG. 3. Other images shown by the device 10 (such as a photograph) may be arranged such that left and right scrolling is also possible depending upon which part of the photograph is currently being shown.

When the user performs a scrolling operation, then the user will rapidly reach the limit of the touchscreen's sensitivity, once the user's finger 14 reaches an outer edge of the touchscreen 12. For example, if it is assumed that the user wishes to scroll the image 18 downwards, then the user will touch the touchscreen 12 (anywhere) with the user's finger 14 and drag the user's finger 14 in a direction 17 downwards toward outer edge 34 until the user's finger 14 reaches the bottom of the touchscreen 12 at outer edge 34. The image 12 being displayed on the touchscreen 12 will move in a normal direction 19 perpendicular to the outer edge 34 in correspondence to (i.e., in synchronization with) the user dragging of the user's finger 14 in the direction 17, at the same time as the user is moving the user's finger 14 in contact with the touchscreen 12. The direction 17 is about equal to the normal direction 19, which means that the direction 17 is within a specified deviation (e.g., 0.5, degree, 1 degree, 2 degrees, etc.) from the normal direction 19.

Figure 4:
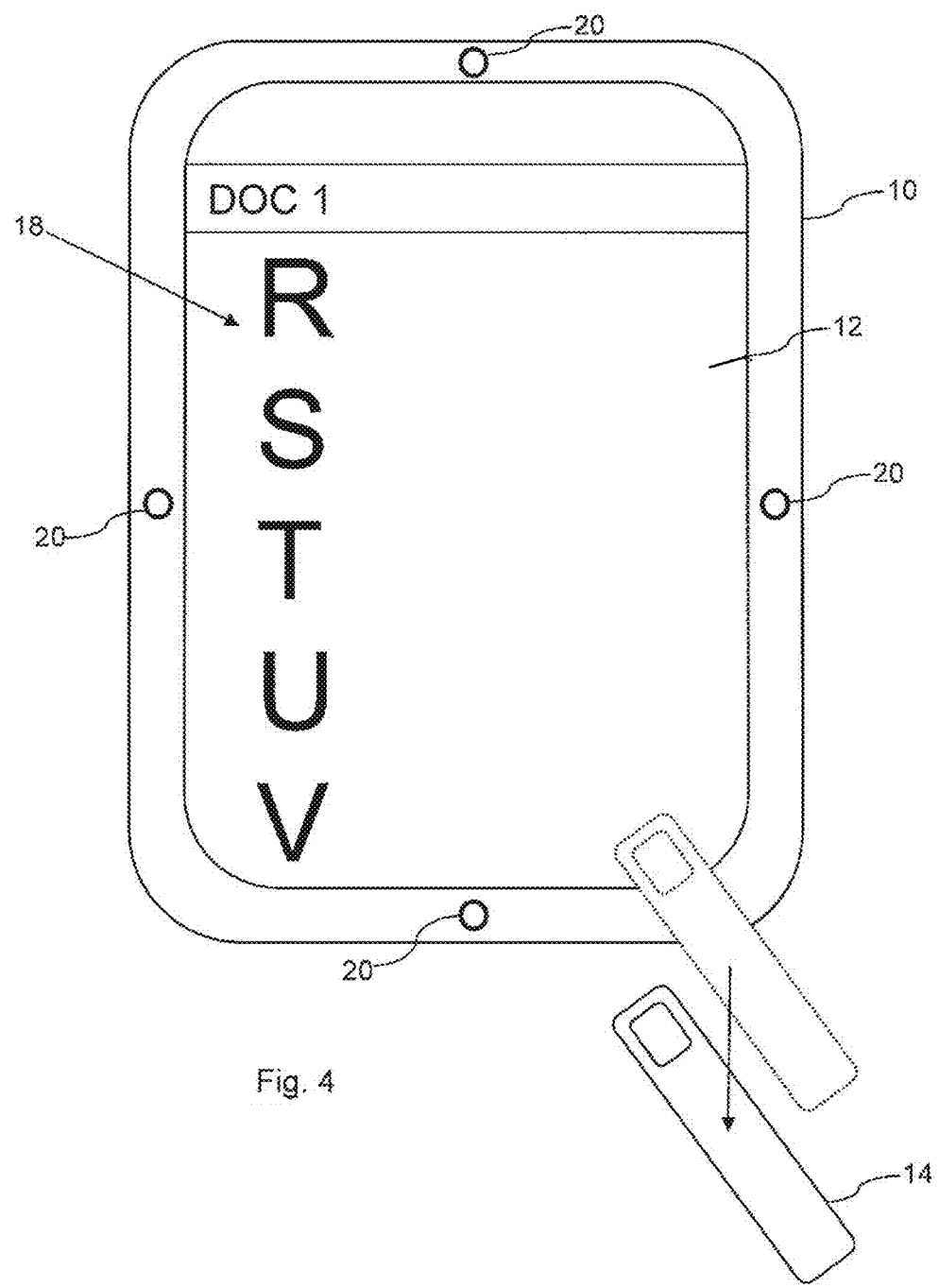

FIG. 4 shows the user continuing to scroll the document image 18, by continuing to move the user's finger 14 in a downwards direction, in accordance with embodiments of the present invention, even though the user's finger 14 is no longer in contact with the touchscreen 12. The user has made a continuous gesture with the user's finger 14, starting with the original touch of the user's finger 14 on the touchscreen 12 and continuing with the user dragging the user's finger 14 downwards while still in contact with the touchscreen 12 and now continuing with the same downwards movement while no longer touching the touchscreen 12. The user is moving the user's finger 14 to the side of and in the same plane as the touchscreen 12 after the user's finger has traversed the outer edge 34 in a direction about equal to the normal direction 19.

The device 10 is provided with one or more motion sensors 20 which are able to detect the continuing movement of the finger 14 even though the finger 14 is no longer in direct contact with the touchscreen 12 or indeed with the device 10 at all. The motion sensors 20 are placed around the touchscreen 12 in the peripheral region 11 and these motion sensors 20 are able to detect the movement of the user's finger 14 in the space immediately adjacent to the touchscreen device 10. The motion sensors 20 provide a range that is significant to the user in the user's interaction with the device 10, up to 20 cm, for example. In the embodiment of FIG. 4, each region 41-44 comprises a motion sensor 20.

The motion sensors 20 are connected to the processor of the device 10, which is controlling the image 18 being displayed by the touchscreen 12. The motion sensors 20 will provide data to the processor on the sensed movement of the user's finger 14 and the processor will use this data to determine that the user is continuing to scroll the image 18 by the user's continuing gesture. The processor will move the displayed image in correspondence to the detected continuing movement of the user's finger 14. In this way, the user does not have to stop the scrolling when the user's finger 14 reaches the limit of the touchscreen 12 of the device 10.

Figure 5:
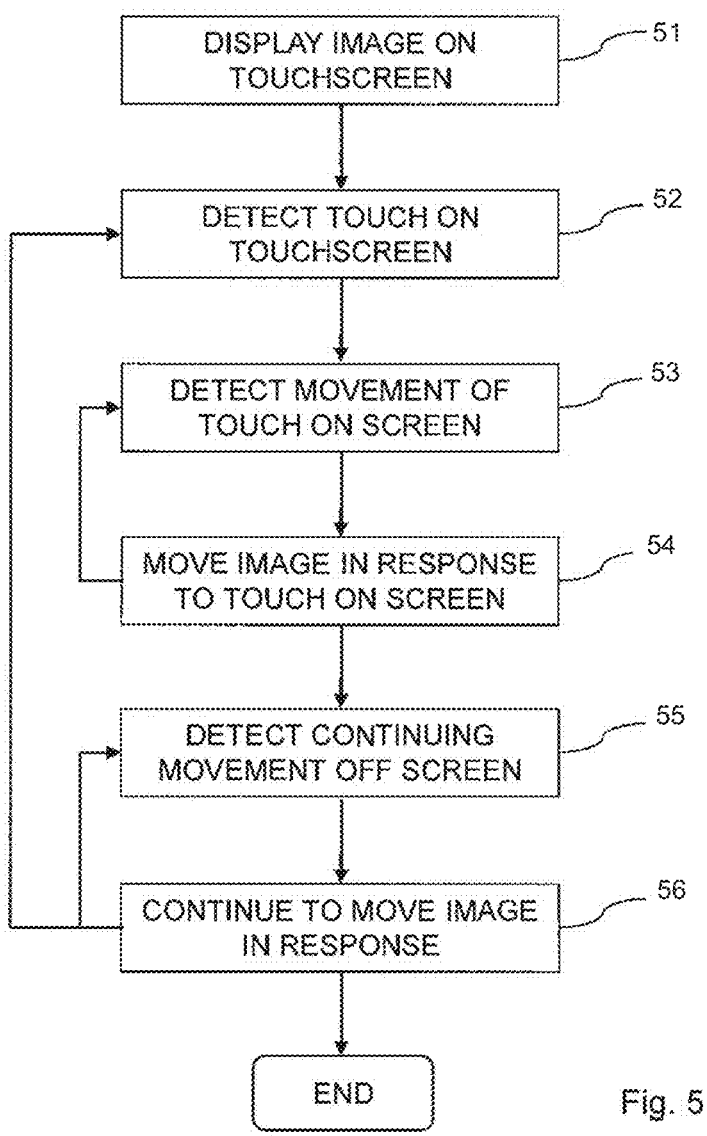
FIG. 5 is a flowchart of a method of operating the touchscreen device, in accordance with embodiments of the present invention.

FIG. 5 shows a flowchart that summarizes the method of operating the touchscreen device 10, in accordance with embodiments of the present invention. This method is executed by the processor of the touchscreen device 10 under the operation of a computer program product from a computer readable storage medium or storage device, which comprises instructions for controlling the processor. The method comprises the steps of, firstly step 51, which comprises displaying the image 18 on the touchscreen 12 of the device 10. The image 18 need not take up the entirety of the touchscreen 12, for example, as in most applications run by the touchscreen device 10 parts of the touchscreen 12 will be used for other elements relating to the current application, for example.

The next step in the method comprises step 52, which comprises detecting a touch by an object 14 on the touchscreen 12. The object 14 could be a user's finger or suitable stylus that can be used on the touchscreen 12, depending upon the technology used (some touchscreens are optimized for large objects such as fingers and some are optimized for small fine pointed objects such as a stylus). The next step of the method is step 53, which comprises detecting movement of the touch on the touchscreen 12. This movement is assumed to be in generally a straight line, but actually any movement can be detected by the touchscreen 12.

The next step in the method comprises step 54, which comprises moving the displayed image 18 in correspondence to the detected movement. The displayed image 18 is moved as the user moves the user's finger 14 (or stylus as appropriate). The next step is step 55, which comprises detecting continuing movement with the motion sensor 20 of the object 14 to the side of and in the same plane of the touchscreen 12, and the final step of the method is step 56, which comprises moving the displayed image 18 in correspondence to the detected continuing movement. So as the user continues to move the user's finger 14 away from the contact with the touchscreen 12, nevertheless, the image on the touchscreen 12 is still moved. The method ends when there is no longer any detected movement of the user's finger 14 by the motion sensor 20.

Various feedback loops are shown in FIG. 5. Steps 53 and 54 will be repeated as the user moves the user's finger 14 over the touchscreen 12. If the user pauses the movement of the user's finger 14 at any time, then the movement of the image 18 will also be paused. These two steps (53 and 54) will repeat while the user is in contact with the touchscreen 12. Similarly, steps 55 and 56 will be repeated as the user moves the user's finger 14 off the touchscreen 12, with each movement that the user makes with the user's finger 14 resulting in a corresponding movement of the image 18. There is also a feedback loop from step 56 to step 52, which indicates that should the user's finger 14 move back from not being in contact with the touchscreen 12 to being in contact with the touchscreen 12, then the conventional image movement will recommence.

The processor of the touchscreen device 10, which is controlling the operation of the touchscreen 12, must operate a protocol to decide when the user's gesture has actually finished, rather than waiting for the user's finger 14 to move outside of the field of view of the motion sensor 20. The processor can be configured to detect that the user's finger 14 has moved a predefined distance away from the plane of the touchscreen 12 and halt movement of the displayed image 18 accordingly. This means that if the user withdraws the user's finger 14 a predefined distance, e.g., 2 cm, away from the plane of the touchscreen 12, then the scrolling of the image 18 will be halted.

Figure 6:
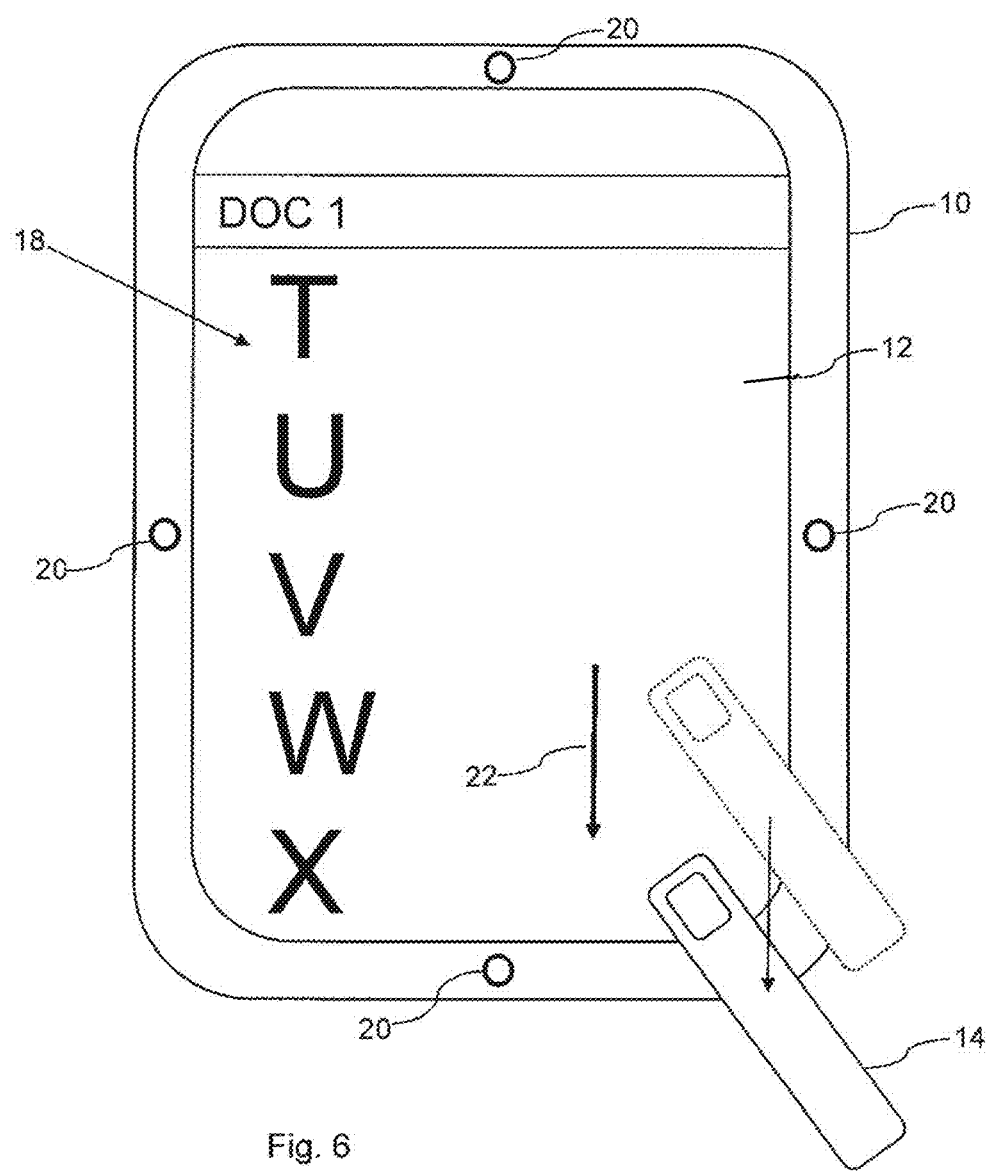
FIGS. 6 and 7 are further schematic diagrams of the touchscreen device, in accordance with embodiments of the present invention.

The processor can also be configured to generate a vector 22 for the detected direction of movement of the user's finger 14 on the touchscreen 12, as shown in FIG. 6 in which the vector 22 is formed from movement of the user's finger 14 from one location on the touchscreen 12 to another (lower) location on the touchscreen 12, in accordance with embodiments of the present invention. The processor can then determine that the detected continuing movement of the user's finger 14 to the side of and in the same plane as the touchscreen 12 is within a predetermined error (i.e., tolerance) of the generated vector 22 as measured in units of angular deviation. This methodology allows the processor to interpret whether the data received from the motion sensor 20, with respect to the movement off the touchscreen 12 is actually a continuation of the movement of the user's finger 14 in contact with the touchscreen 12.

The motion sensor 20, whether embodied as a single motion sensor or as a set of motion sensors 20 placed around the touchscreen 12, do not necessarily have to be in an operational mode all of the time. FIG. 6 depicts a motion sensor 20 on each border of the four borders of the touchscreen 12. The motion sensor 20 can effectively be turned off or placed in a sleep mode and only turned on when actually needed. In this case, the processor detects that the user's finger 14 is no longer touching the touchscreen 12 and activates one or more motion sensors 20, at this point in time, to detect the continuing movement of the user's finger. This reduces the power consumption of the motion sensor 20 and ensures that only relevant gestures pertaining to the user's finger 14 are detected.

Figure 7:
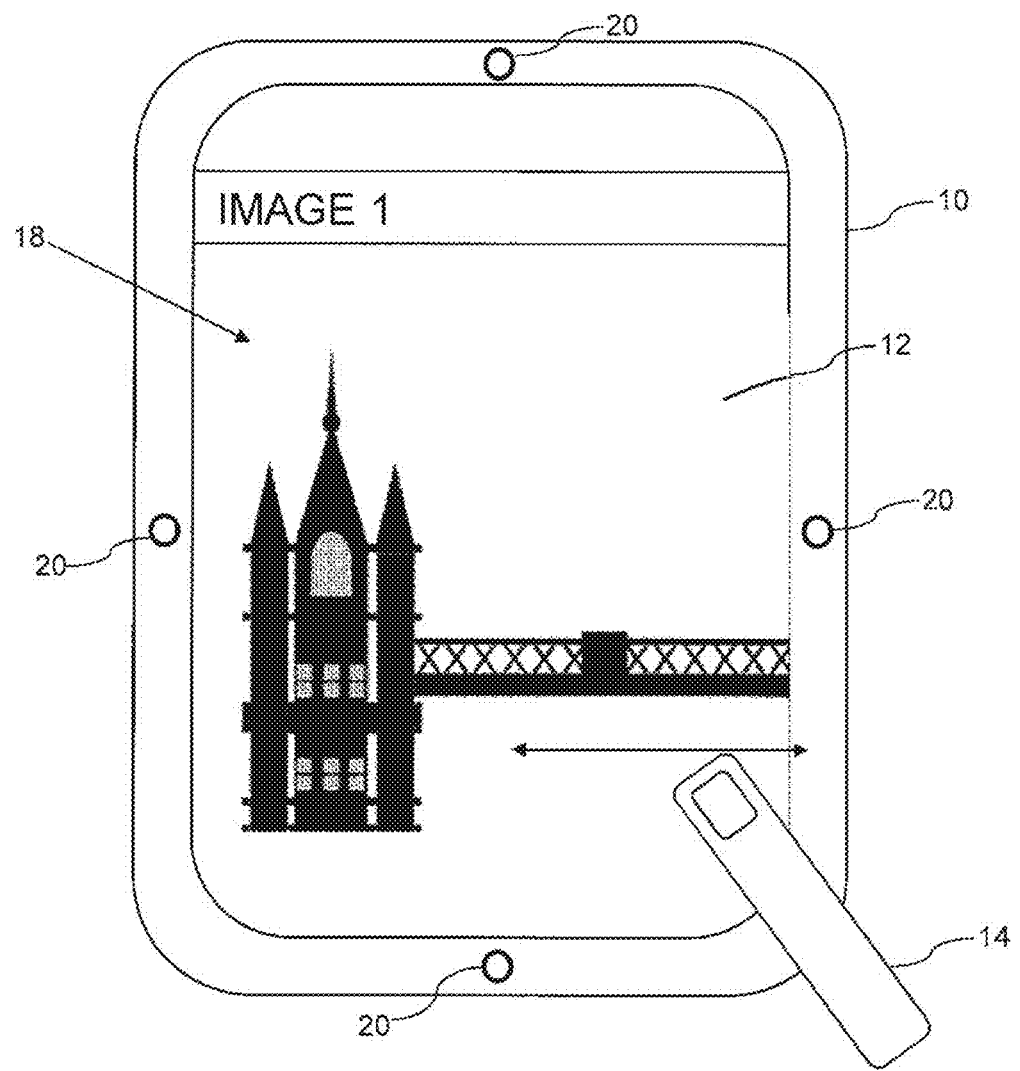

FIG. 7 shows a different view of the touchscreen device 10, where the user is looking at a photograph on the touchscreen 12 of the mobile device 10, in accordance with embodiments of the present invention. Only a small portion 18 of the overall photograph can be seen on the touchscreen 12 and the user may wish to scroll or pan to different parts of the photograph. The user touches the touchscreen 12 with the user's finger 14 at any point on the touchscreen 12 and can then start moving the image 18 around, for example by moving the user's finger 14 to the left or right, as indicated in FIG. 7. The displayed image 18 is moved in correspondence to the detected movement.

If the user's finger 14 reaches the edge of the touchscreen 12, then the user can continue moving the user's finger 14 in the same continuous gesture, even though the user's finger 14 is no longer in direct contact with the touchscreen 12. One or more motion sensors 20 detect the movement of the user's finger 14 in the space adjacent to the touchscreen device 10. The processor of the device 10, which is connected to the motion sensors 20, will continue moving the displayed image 18 in correspondence to the detected continuing movement. The user seamlessly continues the user's original gesture and the displayed image 18 continues to scroll across the touchscreen 12.

The user's scroll and pan interactions do not stop when the user's finger 14 reaches the edge of the touchscreen 12, which normally happens quickly on the small device 10. The device 10 knows where the user's finger 14 leaves the touchscreen 12, making it easier for the processor of the device 10 to catch and follow the finger presence outside the touchscreen 12. A random movement in the motion capture range will not scroll the displayed image 18 because the movement will not be identified as a continuity of the user's interaction. The user's finger 14 (or stylus) does not hide the touchscreen 12 while outside the touchscreen boundaries. The user's finger 14 can return to the touchscreen 12, and the user will see again the original portion of the image 18 that was dragged at first when the interaction was initiated.

Figure 8:
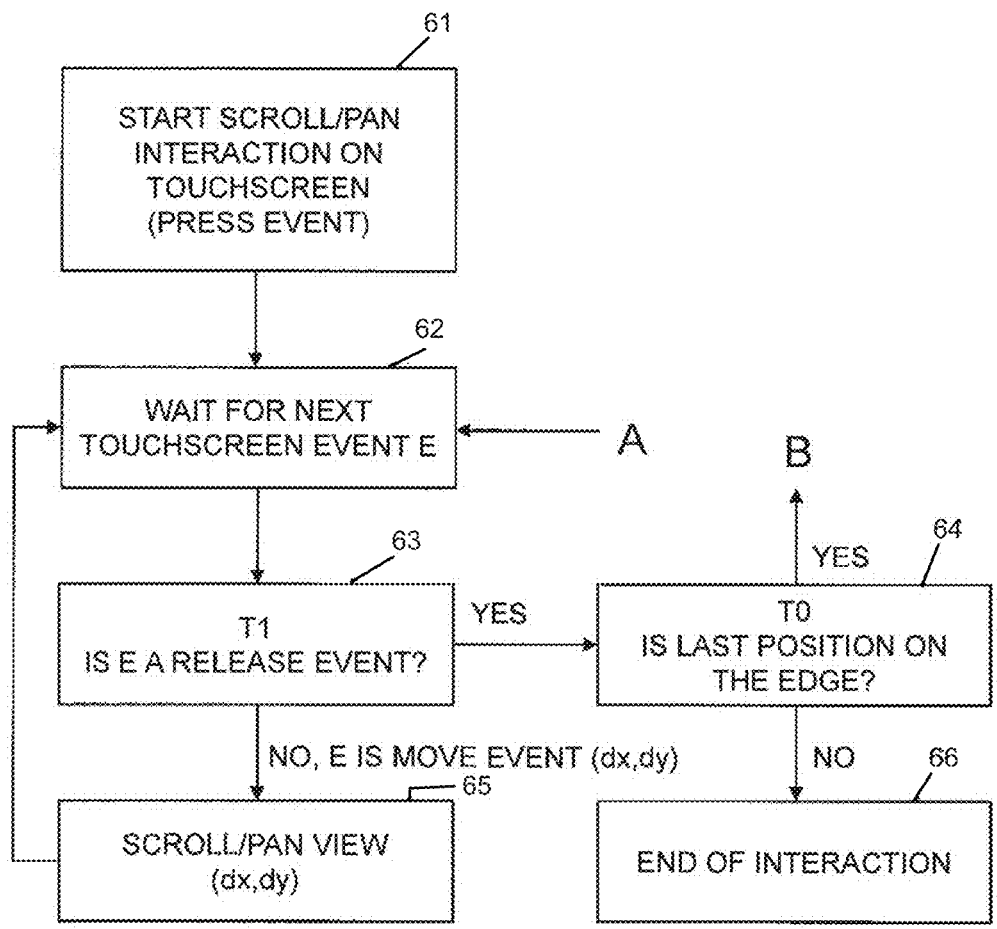
FIG. 8 is a flowchart of touchscreen events, in accordance with embodiments of the present invention.
Figure 9:
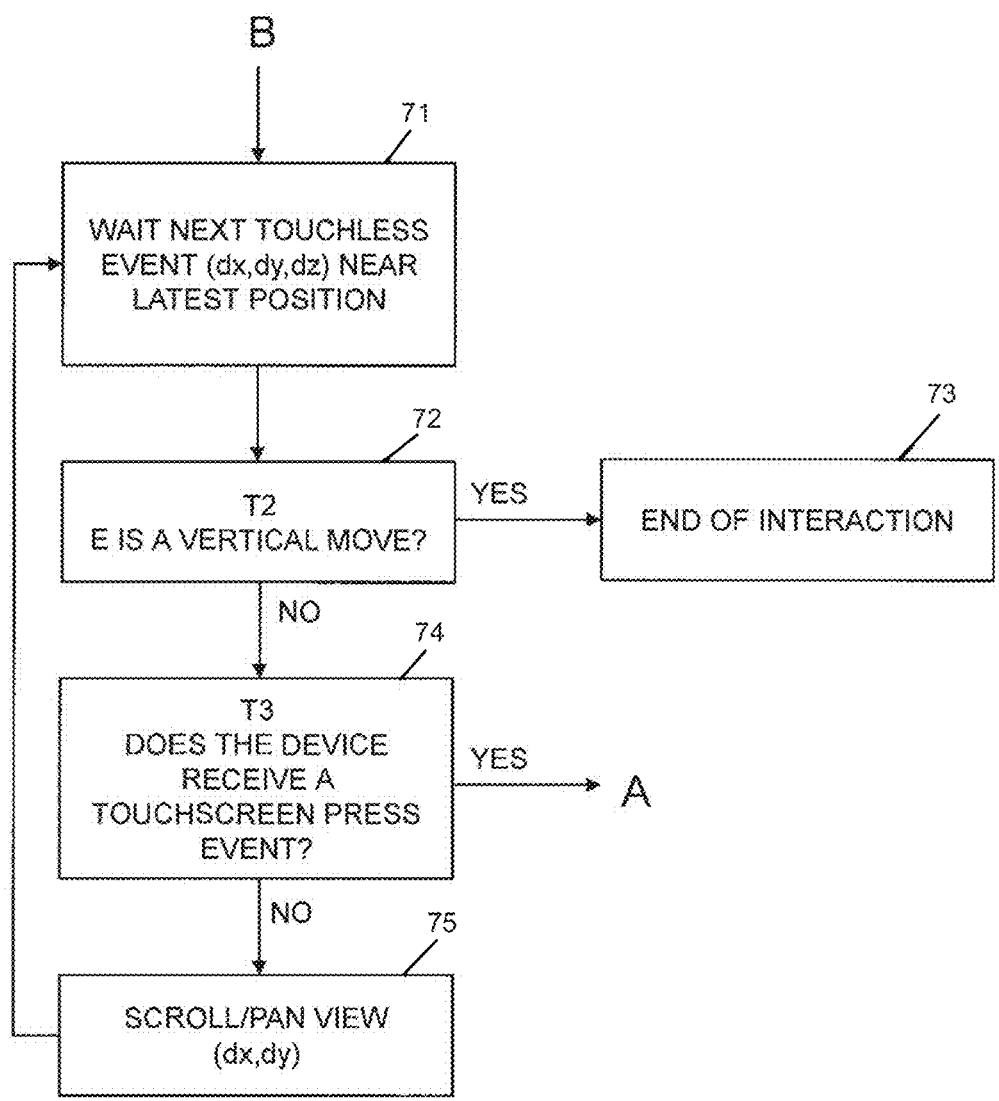
FIG. 9 is a flowchart of off-touchscreen events, in accordance with embodiments of the present invention.

As mentioned above, the touchscreen device 10 is controlled to operate the scrolling/panning of the displayed image 18, without any noticeable change when the user transitions from the touch to the touchless contact with the touchscreen 12. FIGS. 8 and 9 illustrate flowcharts showing the handling of the image scrolling/panning from the point of view of device events, in accordance with embodiments of the present invention. FIG. 8 illustrates the events when the user is in contact with the touchscreen 12 and FIG. 9 illustrates the events when the user is no longer in contact with the touchscreen 12.

The touchscreen 12 generates three types of events: press, release and drag (dx, dy) where dx is the X translation of the finger 14 since the latest position, and dy is the Y translation of the finger 14 since the latest position (see FIG. 1 for X and Y orthogonal directions). Noting that Z denotes a direction perpendicular to the plane of the touchscreen 12 and is thus orthogonal to both X and Y, the touchless motion sensor 20 generates two kinds of event (in three-dimensional space): vertical motion (dx, dy, dz), where dz is "bigger than dx and dy" (for example: $dz^2 > dx^2 + dy^2$) and horizontal motion (dx, dy, dz), otherwise when dz "is smaller than dx and dy". It can be assumed that the motion events are filtered to keep only the event occurring near the latest position. As for the touchscreen 12, dx, dy, and dz are the delta coordinates from the last detected position of the finger 14. Also, the reported events are motion-oriented just to make things easier to understand, but actually it does not make any assumption on the type of touchless sensors, which can be static sensors and report a motion representing the delta between two static inputs, provided the two static inputs are different.

In FIG. 8, step 61 detects initiation of a scroll/pan interaction on the touchscreen 12 due to a pressing of the touchscreen 12 by the user's finger 14. Step 62 waits for a next event (E) in which the touchscreen 12 is touched. Step 63 determines whether the next event (E) is a release event (T1-YES to step 64) or is a move event (T1-NO to step 65). In step 65, the scroll/pan interaction continues and control passes back to step 62 to wait for the next event). When moving from touch to touchless, the device 10 interprets a release event (T1-YES to step 64) as either close to the edge as a transition to the touchless interaction (point B at step 71 in the FIG. 9 flowchart) or as an end of the interaction in step 66. In step 71 the next touchless event will take over the interaction if it is in continuity with the last position on the touchscreen 12. For that there is a check in step 72 to see if it is a horizontal move (T2-NO to step 74) or is a vertical move (T2-YES to end the interaction in step 73). The touchless interaction proceeds through the loop T3-NO to pan in step 75 and then loops back to step 71 to wait for the next touchless event, then T2-NO, until the control goes back to the touchscreen 12 (T3-YES to point A at step 62 in the FIG. 8 flowchart) or the interaction is finished by a vertical move (T2-YES to end the interaction in step 73).

In FIG. 9, when moving from touchless to touch, the device 10 checks for a touchscreen press event (T3-YES) in the middle of the touchless loop, and then waits for the next touchscreen event (A) which is expected to be a move event. On the hardware side, touch events are more reliable than touchless events, the test T3 in step 74 is also a means to quickly bring the interaction back onto the touchscreen 12. According to the reliability of the touchless sensor 20, there may need to be a time-out system at the transition point B in order not to block the device. For example, once the time-out is reached, the interaction is completed. The touchscreen device 10 may be a smartphone, PDA, tablet, or any computer or computer system having a touchscreen 12 that may be touched by the user's finger 14 to scroll text and/or images horizontally and/or vertically on the screen.

Figure 10:
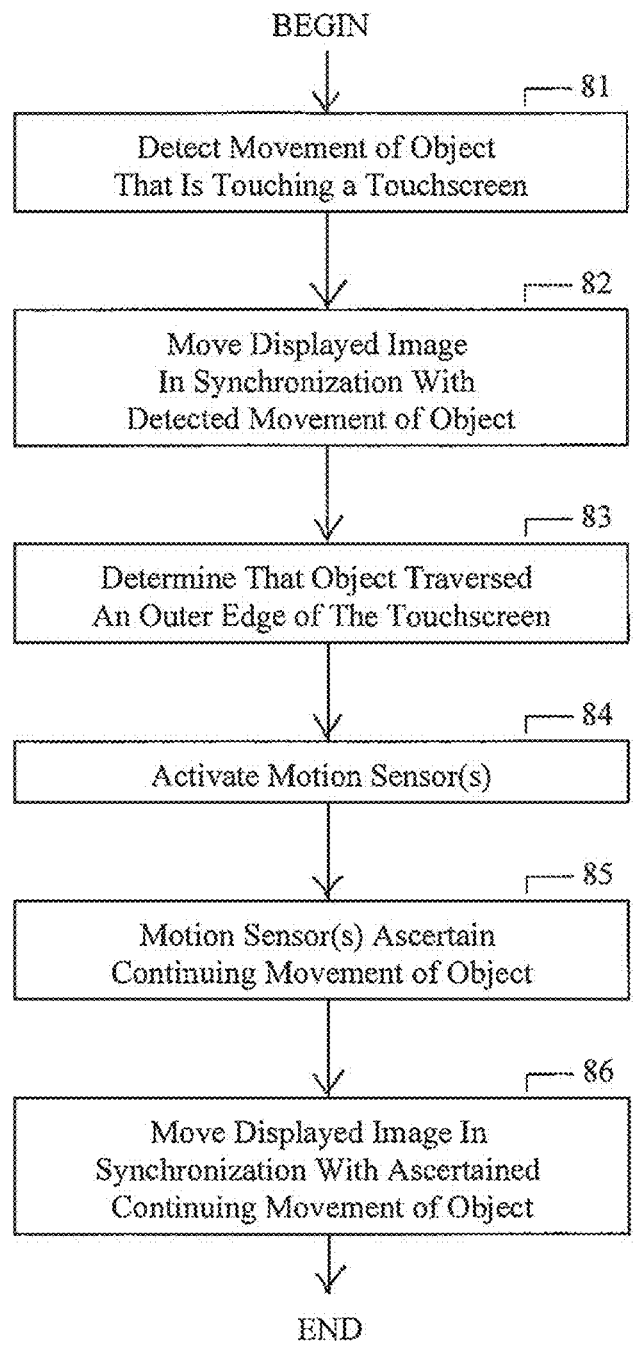
FIG. 10 is a flow chart depicting a method for moving an image displayed on a touchscreen of a device, in accordance with embodiments of the present invention.

FIG. 10 is a flow chart depicting a method for moving an image displayed on a touchscreen of a device, in accordance with embodiments of the present invention. The flow chart of FIG. 10 comprises steps 81-86.

Step 81 detects a movement of an object along the touchscreen of the device in a first direction toward a first outer edge of the touchscreen while the object is touching the touchscreen, and in response, step 82 moves the displayed image in a second direction toward the first outer edge in synchronization with the detected movement of the object, wherein the second direction is perpendicular to the first outer edge, and wherein the first direction is about equal to the second direction. In one embodiment, the displayed image moves toward the first outer edge at about the same speed as the speed at which the object moves toward the first outer edge while the object is touching the touchscreen. The phrase "at about the same speed as" means "within a predefined tolerance of".

After the movement of the object is detected while the object is touching the touchscreen, step 83 determines that the object has traversed the first outer edge of the touchscreen in a third direction so as to no longer be touching the touchscreen, and in response, step 84 activates one or more motion sensors to monitor the object for continuing movement of the object, wherein the third direction is about equal to the second direction, and wherein the device comprises the one or more motion sensors. In one embodiment, the displayed image moves away from the first outer edge at about the same speed as the speed at which the object is traversing the first outer edge.

After the one or more motion sensors are activated, in step 85 the one or more motion sensors ascertain the continuing movement of the object in a fourth direction away from the first outer edge, and in response, step 86 moves the displayed image in the second direction toward the first outer edge in synchronization with the ascertained continuing movement of the object, wherein the fourth direction is about equal to the second direction.

Figure 11:
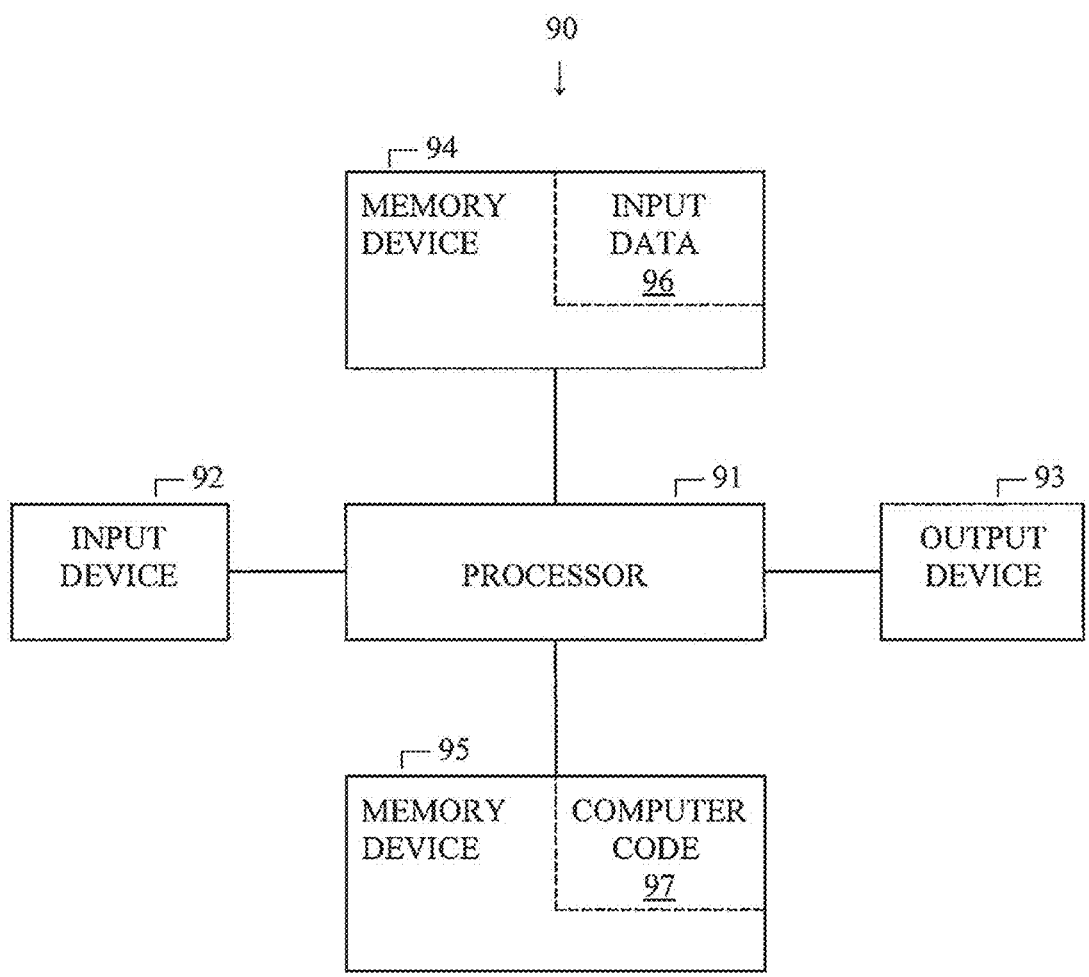
FIG. 11 illustrates a computer or computer system used for implementing the methods of the present invention.

FIG. 11 illustrates a computer or computer system 90 (e.g., in the device 10) used for implementing methods of the present invention. The computer or computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touch screen, a scanner, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes computer program code 97 which is a computer program that comprises computer-executable instructions. The program code 97 includes software or program instructions that may implement methods of the present invention. The processor 91 executes the program code 97. The memory device 94 includes input data 96. The input data 96 includes input required by the program code 97. The output device 93 displays output from the program code 97. Either or both memory devices 94 and 95 (or one or more additional memory devices not shown in FIG. 11) may be used as a computer readable storage medium or device (or program storage device) having a computer readable program embodied therein and/or having other data stored therein, wherein the computer readable program comprises the program code 97. Generally, a computer program product (or, alternatively, an article of manufacture) of the computer system 90 may comprise said computer readable storage medium (or said program storage device). A computer readable storage device of the present invention, when storing the program code 97 for execution by one or more processors, is not a transmission medium such as a copper transmission cable, an optical transmission fiber, or a wireless transmission medium.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices. As another example, the processor 91 may represent one or more processors, and each memory device of memory devices 94 and 95 may represent one or more memory devices and/or one or more computer readable storage devices.

A device (e.g., mobile device, computer) or computer system of the present invention comprises a processor, a computer readable hardware storage medium, and a memory, wherein the storage medium comprises computer readable program code which, upon being executed by the processor via the memory, performs the methods of the present invention.

A computer program product of the present invention comprises a processor in a device and a computer readable (hardware) storage medium in the device, wherein the storage medium comprises computer readable program code which, upon being executed by the processor, performs the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for moving an image of displayable content displayed on a touchscreen of a device, said method comprising;
    detecting, by a processor in the device, a movement of an object along the touchscreen of the device in a first direction toward a first outer edge of the touchscreen while the object is touching the touchscreen, and in response, said processor moving the displayed image in a second direction toward the first outer edge in synchronization with the detected movement of the object, wherein the second direction is perpendicular to the first outer edge, and wherein the first direction is equal to the second direction;
    after said detecting the movement of the object while the object is touching the touchscreen, said processor determining that the object has traversed the first outer edge of the touchscreen in a third direction in a transition from touching the touchscreen to no longer touching the touchscreen;
    in response to said determining that the object has traversed the first outer edge of the touchscreen in the third direction in the transition from touching the touchscreen to no longer touching the touchscreen, said processor activating one or more motion sensors to monitor the object for continuing movement of the object, wherein the third direction is equal to the second direction, and wherein the device comprises the one or more motion sensors; and
    after said activating the one or more motion sensors, said one or more motion sensors ascertaining the continuing movement of the object in a fourth direction away from the first outer edge, and in response, said processor moving the displayed image in the second direction toward the first outer edge in synchronization with the ascertained continuing movement of the object, wherein the fourth direction is equal to the second direction.

2. The method of claim 1, said method further comprising:
    said processor detecting that the object has moved a predefined distance away from a plane of the touchscreen, and in response, halting movement of the displayed image.

3. The method of claim 1, wherein the device comprises a peripheral region surrounding the touchscreen, wherein the peripheral region is in direct physical contact with four outer edges of the touchscreen, wherein the four outer edges comprise the first outer edge, wherein peripheral region and the touchscreen do not anywhere overlap each other in a direction perpendicular to the touchscreen, and wherein the one or more motion sensors are disposed in the peripheral region.

4. The method of claim 3, wherein the peripheral region comprises four subregions, wherein each subregion is in direct physical contact with a respective outer edge of the four outer edges, wherein the one or more motion sensors comprises four motion sensors, and wherein each subregion comprises at least one motion sensor of the four motion sensors.

5. The method of claim 1, wherein the displayed image moves toward the first outer edge at about the same speed as the speed at which the object moves toward the first outer edge while the object is touching the touchscreen.

6. The method of claim 1, wherein the displayed image moves away from the first outer edge at about the same speed as the speed at which the object is traversing the first outer edge.

7. The method of claim 1, wherein the device is a mobile device.

8. The method of claim 1, wherein the device is a computer.

9. A device comprising a processor, a computer readable hardware storage medium, and a memory, wherein the storage medium comprises computer code which, upon being executed by the processor via the memory, performs a method for moving an image of displayable content displayed on a touchscreen of the device, said method comprising:

said processor detecting a movement of an object along the touchscreen of the device in a first direction toward a first outer edge of the touchscreen while the object is touching the touchscreen, and in response, said processor moving the displayed image in a second direction toward the first outer edge in synchronization with the detected movement of the object, wherein the second direction is perpendicular to the first outer edge, and wherein the first direction is equal to the second direction;

after said detecting the movement of the object while the object is touching the touchscreen, said processor determining that the object has traversed the first outer edge of the touchscreen in a third direction in a transition from touching the touchscreen to no longer touching the touchscreen;

in response to said determining that the object has traversed the first outer edge of the touchscreen in the third direction in the transition from touching the touchscreen to no longer touching the touchscreen, said processor activating one or more motion sensors to monitor the object for continuing movement of the object, wherein the third direction is equal to the second direction, and wherein the device comprises the one or more motion sensors; and after said activating the one or more motion sensors, said one or more motion sensors ascertaining the continuing movement of the object in a fourth direction away from the first outer edge, and in response, said processor moving the displayed image in the second direction toward the first outer edge in synchronization with the ascertained continuing movement of the object, wherein the fourth direction is equal to the second direction.

10. The device of claim 9, said method further comprising:

said processor detecting that the object has moved a predefined distance away from a plane of the touchscreen, and in response, halting movement of the displayed image.

11. The device of claim 9, wherein the device comprises a peripheral region surrounding the touchscreen, wherein the peripheral region is in direct physical contact with four outer edges of the touchscreen, wherein the four outer edges comprise the first outer edge, and wherein the one or more motion sensors are disposed in the peripheral region.

12. The device of claim 11, wherein the peripheral region comprises four subregions, wherein each subregion is in direct physical contact with a respective outer edge of the four outer edges, wherein the one or more motion sensors comprises four motion sensors, wherein peripheral region and the touchscreen do not anywhere overlap each other in a direction perpendicular to the touchscreen, and wherein each subregion comprises at least one motion sensor of the four motion sensors.

13. The device of claim 9, wherein the displayed image moves toward the first outer edge at about the same speed as the speed at which the object moves toward the first outer edge while the object is touching the touchscreen.

14. The device of claim 9, wherein the displayed image moves away from the first outer edge at about the same speed as the speed at which the object is traversing the first outer edge.

15. A computer program product, comprising a processor in a device and a computer readable hardware storage medium in the device, wherein the storage medium comprises computer readable program code which, upon being executed by the processor, performs a method for moving an image of displayable content displayed on a touchscreen of the device, said method comprising:

said processor detecting a movement of an object along the touchscreen of the device in a first direction toward a first outer edge of the touchscreen while the object is touching the touchscreen, and in response, said processor moving the displayed image in a second direction toward the first outer edge in synchronization with the detected movement of the object, wherein the second direction is perpendicular to the first outer edge, and wherein the first direction is equal to the second direction;

after said detecting the movement of the object while the object is touching the touchscreen, said processor determining that the object has traversed the first outer edge of the touchscreen in a third direction in a transition from touching the touchscreen to no longer touching the touchscreen;

in response to said determining that the object has traversed the first outer edge of the touchscreen in the third direction in the transition from touching the touchscreen to no longer touching the touchscreen, said processor activating one or more motion sensors to monitor the object for continuing movement of the object, wherein the third direction is equal to the second direction, and wherein the device comprises the one or more motion sensors; and after said activating the one or more motion sensors, said one or more motion sensors ascertaining the continuing movement of the object in a fourth direction away from the first outer edge, and in response, said processor moving the displayed image in the second direction toward the first outer edge in synchronization with the ascertained continuing movement of the object, wherein the fourth direction is equal to the second direction.

16. The computer program product of claim 15, said method further comprising:

said processor detecting that the object has moved a predefined distance away from a plane of the touchscreen, and in response, halting movement of the displayed image.

17. The computer program product of claim 15, wherein the device comprises a peripheral region surrounding the touchscreen, wherein the peripheral region is in direct physical contact with four outer edges of the touchscreen, wherein peripheral region and the touchscreen do not anywhere overlap each other in a direction perpendicular to the touchscreen, wherein the four outer edges comprise the first outer edge, and wherein the one or more motion sensors are disposed in the peripheral region.

18. The computer program product of claim 17, wherein the peripheral region comprises four subregions, wherein each subregion is in direct physical contact with a respective outer edge of the four outer edges, wherein the one or more motion sensors comprises four motion sensors, and wherein each subregion comprises at least one motion sensor of the four motion sensors.

19. The computer program product of claim 15, wherein the displayed image moves toward the first outer edge at about the same speed as the speed at which the object moves toward the first outer edge while the object is touching the touchscreen.

20. The computer program product of claim 15, wherein the displayed image moves away from the first outer edge at about the same speed as the speed at which the object is traversing the first outer edge.

* * * * *